(12) United States Patent
Bailey

(10) Patent No.: US 6,658,407 B1
(45) Date of Patent: Dec. 2, 2003

(54) CLAUSE-BASED RELATIONAL QUERIES

(75) Inventor: Ronald H. Bailey, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 452 days.

(21) Appl. No.: 09/606,637

(22) Filed: Jun. 29, 2000

(51) Int. Cl.⁷ .......................... G06F 17/30; G06F 9/44; G06F 9/45

(52) U.S. Cl. ................. 707/3; 707/2; 717/116; 717/140

(58) Field of Search .................. 707/3, 2, 1, 4; 717/116, 140

(56) References Cited

U.S. PATENT DOCUMENTS 6,374,252 B1 * 4/2002 Althoff et al. .............. 707/102

\* cited by examiner

*Primary Examiner*—Safet Metjahic
*Assistant Examiner*—Marc Filipczyk
(74) *Attorney, Agent, or Firm*—Woodcock Washburn LLP

(57) ABSTRACT

Query objects facilitate accessing data contained in a database by allowing a user to query the database without having to know SQL or the relationships between the underlying tables in the database. These query objects are built from clauses and are related to each other by clause operators. These query operators define operations on the query objects, such as union, intersection, and intersection-complement operators. New query objects are constructed based on operand query objects and the query operators by which the operand query objects are related.

39 Claims, 17 Drawing Sheets

CLAUSE-BASED RELATIONAL QUERIES

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2000, Microsoft, Inc.

1. Field of the Invention

The invention relates generally to electronic databases. More particularly, the invention relates to querying of relational databases.

2. Background

Database systems interact with users and applications to provide them with access to data contained in data tables. Traditionally, database systems have used a two-tier architecture to provide this access. In a two-tier architecture, the user or application, known as a client, issues a query to a server on which the data tables reside. The server then returns the requested data to the client. Thus, in a system employing a two-tier architecture, applications directly access the data tables. In order to access the data tables effectively, applications must be programmed with knowledge of the structure of the database. Further, all data validation rules must be programmed into each application that uses the database.

Changing the database structure or the data validation rules governing the database pose a particular challenge to database systems that use a two-tier architecture. In particular, any time a change is made to the structure of the data in the database, the knowledge programmed into all the applications accessing the database is no longer valid. Also, whenever a validation rule is changed, all the applications that access the database have to be updated to reflect the change. To address this problem, alternative architectures have been proposed.

One such architecture is the three-tier database. In a three-tier database, the database and applications layers are present, just as in the two-tier architecture. In addition, however, a data layer is conceptually interposed between these layers, forming a third tier. In the three-tier architecture, all applications access the database through the data layer, rather than directly, as in the two-tier architecture. The data layer provides all of the access methods to query and update the underlying tables. A number of benefits result from using the data layer as an interface between the database and the applications. One major benefit is that structural and locational changes can be made to the database without necessarily requiring changes to all of the applications. Further, all data validation and security is handled by the data layer, making it easier to implement changes in the database.

Although three-tier databases do address several issues concerning two-tier databases, certain issues still remain to be adequately addressed. For example, multi-tier relational databases have generally lacked methods of querying relational data objects.

SUMMARY OF THE INVENTION

Various implementations of the present invention facilitate accessing data in a relational database by providing data objects known as query objects and further providing query operators that users can employ to work with the query objects. These data objects encapsulate knowledge of the relationships between tables in the database and reside in the data layer. The query operators define operations on the query objects, including such operations as union, intersection, and intersection-complement operations. According to various implementations of the invention, new query objects are constructed based on constituent query objects and the query operators by which they are related. By using query objects and query operators, users can query a relational database without knowledge of query languages and without knowledge of the relationships between the underlying data tables in the database.

According to one particular implementation of the present invention, selected information is retrieved from an electronic database by constructing first and second query objects. A third query object is then constructed as a function of at least one clause object of the first and second query objects and a query operator. Next, a query string is generated as a function of the third query object and is submitted to the electronic database. The electronic database presents the selected information in response to the query string.

In another implementation, each of the first and second query objects has clause objects and a base object type. The third query object has the same base object type as the first query object, and is formed by adding a first clause group of the clause objects of the first query object and a second clause group of the clause objects of the second query object. The first and second clause groups are separated by a clause operator determined as a function of a query operator. The third query object is used to build a query string that is submitted to the electronic database. The electronic database presents selected information in response to the query string.

Still another implementation is directed to a computer arrangement. A query object has clause objects generated as a function of sets of clause objects contained in two operand query objects and a query operator. A clause processor module generates a query string as a function of the clause objects and submits the query string to a database server storing data tables. The database server returns data from its data tables in response to the query string.

Yet another implementation of the present invention is directed to a storage medium that stores a query object construction module that receives sets of clause objects from two query objects and a query operator and constructs a third query object as a function of the received clause objects and the query operator. The storage medium further stores a query string generator module that generates a query string as a function of the third query object and submits it to an electronic database. The electronic database presents information selected in response to the query string.

In another particular implementation, a data structure stored on a storage medium includes a clause collection having clause objects generated as a function of two sets of clause objects and a query operator. A clause processor module generates a query string as a function of the plurality of clause objects and submits the query string to a database server, which returns information selected as a function of the query string.

Still other implementations include computer-readable media and apparatuses for performing these methods. The above summary of the present invention is not intended to describe every implementation of the present invention. The figures and the detailed description that follow more particularly exemplify these implementations.

DETAILED DESCRIPTION

In the following detailed description of various embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Hardware and Operating Environment

Figure 1:
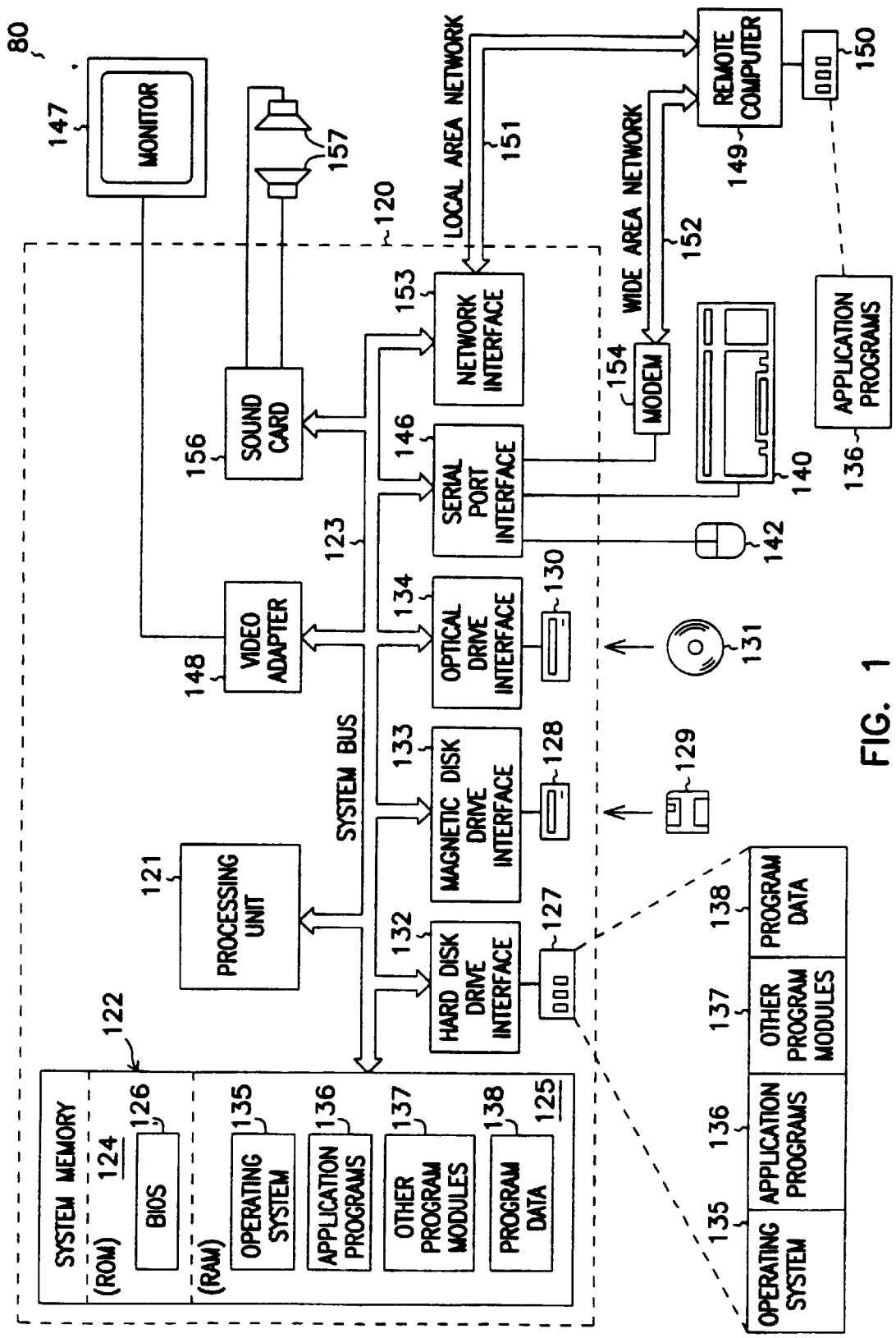
FIG. 1 illustrates a simplified overview of an example embodiment of a computing environment for the present invention.

FIG. 1 illustrates a hardware and operating environment in conjunction with which embodiments of the invention may be practiced. The description of FIG. 1 is intended to provide a brief, general description of suitable computer hardware and a suitable computing environment with which the invention may be implemented. Although not required, the invention is described in the general context of computer-executable instructions, such as program modules, being executed by a computer, such as a personal computer (PC). This is one embodiment of many different computer configurations, some including specialized hardware circuits to analyze performance, that may be used to implement the present invention. Generally, program modules include routines, programs, objects, components, data structures, etc. that perform particular tasks or implement particular abstract data types.

Moreover, those skilled in the art will appreciate that the invention may be practiced with other computer-system configurations, including hand-held devices, multiprocessor systems, microprocessor-based or programmable consumer electronics, network personal computers ("PCs"), minicomputers, mainframe computers, and the like. The invention may also be practiced in distributed computing environments where tasks are performed by remote processing devices linked through a communications network. In a distributed computing environment, program modules may be located in both local and remote memory storage devices.

FIG. 1 shows a computer arrangement implemented as a general-purpose computing or information-handling system 80. This embodiment includes a general purpose computing device such as personal computer (PC) 120, that includes processing unit 121, a system memory 122, and a system bus 123 that operatively couples the system memory 122 and other system components to processing unit 121. There may be only one or there may be more than one processing unit 121, such that the processor computer 120 comprises a single central-processing unit (CPU), or a plurality of processing units, commonly referred to as a parallel processing environment. The computer 120 may be a conventional computer, a distributed computer, or any other type of computer; the invention is not so limited.

In other embodiments other configurations are used in PC 120. System bus 123 may be any of several types, including a memory bus or memory controller, a peripheral bus, and a local bus, and may use any of a variety of bus architectures. The system memory 122 may also be referred to as simply the memory, and it includes read-only memory (ROM) 124 and random-access memory (RAM) 125. A basic input/output system (BIOS) 126, stored in ROM 124, contains the basic routines that transfer information between components of personal computer 120. BIOS 126 also contains start-up routines for the system.

Personal computer 120 further includes hard disk drive 127 having one or more magnetic hard disks (not shown) onto which data is stored and retrieved for reading from and writing to hard-disk-drive interface 132, magnetic disk drive 128 for reading from and writing to a removable magnetic disk 129, and optical disk drive 130 for reading from and/or writing to a removable optical disk 131 such as a CD-ROM, DVD or other optical medium. Hard disk drive 127, magnetic disk drive 128, and optical disk drive 130 are connected to system bus 123 by a hard-disk drive interface 132, a magnetic-disk drive interface 133, and an optical-drive interface 134, respectively. The drives 127, 128, and 130 and their associated computer-readable media 129, 131 provide nonvolatile storage of computer-readable instructions, data structures, program modules and other data for personal computer 120. Although the exemplary environment described herein employs a hard disk, a removable magnetic disk 129 and a removable optical disk 131, those skilled in the art will appreciate that other types of computer-readable media which can store data accessible by a computer may also be used in the exemplary operating environment. Such media may include magnetic tape cassettes, flash-memory cards, digital video disks (DVD), Bernoulli cartridges, RAMs, ROMs, and the like.

In various embodiments, program modules are stored on the hard disk drive 127, magnetic disk 129, optical disk 131, ROM 124 and/or RAM 125 and may be moved among these devices, e.g., from hard disk drive 127 to RAM 125. Program modules include operating system 135, one or more application programs 136, other program modules 137, and/or program data 138. A user may enter commands and information into personal computer 120 through input devices such as a keyboard 140 and a pointing device 142. Other input devices (not shown) for various embodiments include one or more devices selected from a microphone, joystick, game pad, satellite dish, scanner, or the like. These and other input devices are often connected to the processing unit 121 through a serial-port interface 146 coupled to system bus 123, but in other embodiments they are connected through other interfaces not shown in FIG. 1, such as a parallel port, a game port, or a universal serial bus (USB) interface. A monitor 147 or other display device also connects to system bus 123 via an interface such as a video adapter 148. In some embodiments, one or more speakers 157 or other audio output transducers are driven by sound adapter 156 connected to system bus 123. In some embodiments, in addition to the monitor 147, the system 80 includes other peripheral output devices (not shown) such as a printer or the like.

In some embodiments, personal computer 120 operates in a networked environment using logical connections to one or more remote computers such as remote computer 149. Remote computer 149 may be another personal computer, a server, a router, a network PC, a peer device, or other common network node. Remote computer 149 typically includes many or all of the components described above in connection with personal computer 120; however, only a storage device 150 is illustrated in FIG. 1. The logical connections depicted in FIG. 1 include local-area network (LAN) 151 and a wide-area network (WAN) 152, both of which are shown connecting PC 120 to remote computer 149; typical embodiments would only include one or the other. Such Networking environments are commonplace in offices, enterprise-wide computer networks, Intranets and the Internet.

When placed in a LAN networking environment, the PC 120 connects to local network 151 through a network interface or adapter 153. When used in a WAN networking environment such as the Internet, the PC 120 typically includes modem 154 or other means for establishing communications over network 152. Modem 154 may be internal or external to PC 120 and connects to system bus 123 via serial-port interface 146 in the embodiment shown. In a networked environment, program modules depicted as residing within PC 120 or portions thereof may be stored in remote-storage device 150. Of course, the network connections shown are illustrative, and other means of establishing a communications link between the computers may be substituted.

Software may be designed using many different methods, including object-oriented programming methods. C++ and Java are two examples of common object-oriented computer programming languages that provide functionality associated with object-oriented programming. Object-oriented programming methods provide a means to encapsulate data members (properties) and member functions (methods) that operate on that data into a single entity called a class. Object-oriented programming methods also provide a means to create new classes based on existing classes.

An object is an instance of a class. The data members of an object are attributes that are stored inside the computer memory, and the methods are executable computer code that act upon this data, along with potentially providing other services. The notion of an object is exploited in the present invention in that certain aspects of the invention are implemented as objects in some embodiments.

An interface is a group of related functions that are organized into a named unit. Some identifier may uniquely identify each interface. Interfaces have no instantiation; that is, an interface is a definition only without the executable code needed to implement the methods that are specified by the interface. An object may support an interface by providing executable code for the methods specified by the interface. The executable code supplied by the object must comply with the definitions specified by the interface. The object may also provide additional methods. Those skilled in the art will recognize that interfaces are not limited to use in or by an object-oriented programming environment.

Example Embodiments

The present invention offers a way for users to query a relational Structured Query Language (SQL) database without having to know either SQL or the relationships between the underlying data tables in the database. A three-tier database architecture is used that includes a database layer, a data layer, and an applications layer. Applications, which reside on the applications layer, access the database using the data layer as an interface. Because all data interactions occur through the data layer, the underlying data tables can be changed without having to change the applications that interact with the data.

Data structures known as query objects reside on the data layer and represent queries. Query objects encapsulate the knowledge of the relationships between the various data tables in the database so that users do not need to know these relationships in order to work with the database. Each query object is based on one of the underlying data tables and by default returns all of the records in that table. The user can query the data tables for particular records by adding clauses, which the data object uses to restrict which records are returned to the user. For example, considering a table of students with name, address, city, and other information, a user who wants a list of all students who live in Boston could create a query object based on the table of students and add a clause of "City='Boston'." This query object would return the records for all students whose city field holds a value of "Boston."

Figure 2:
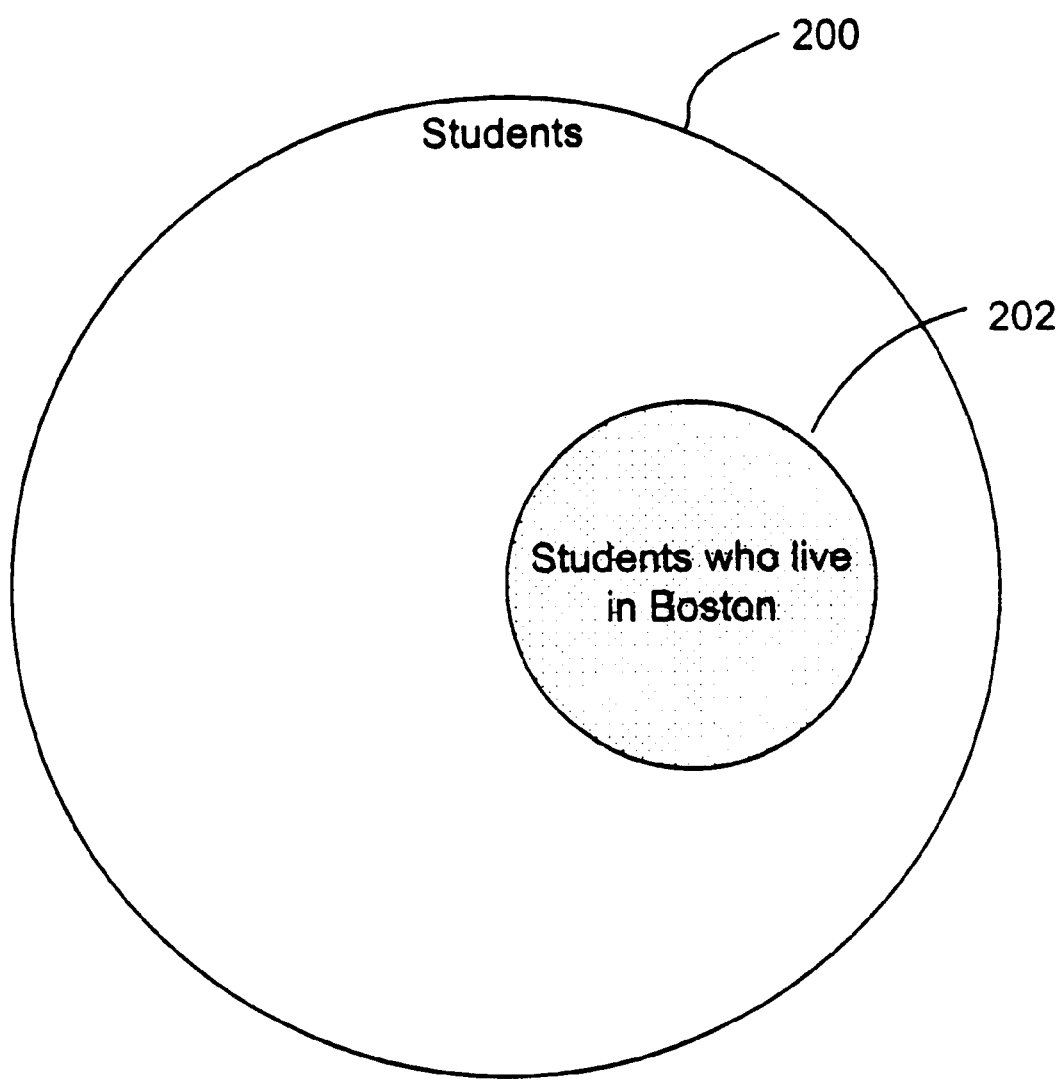
FIG. 2 is a diagram conceptually illustrating a first example query object.
Figure 3:
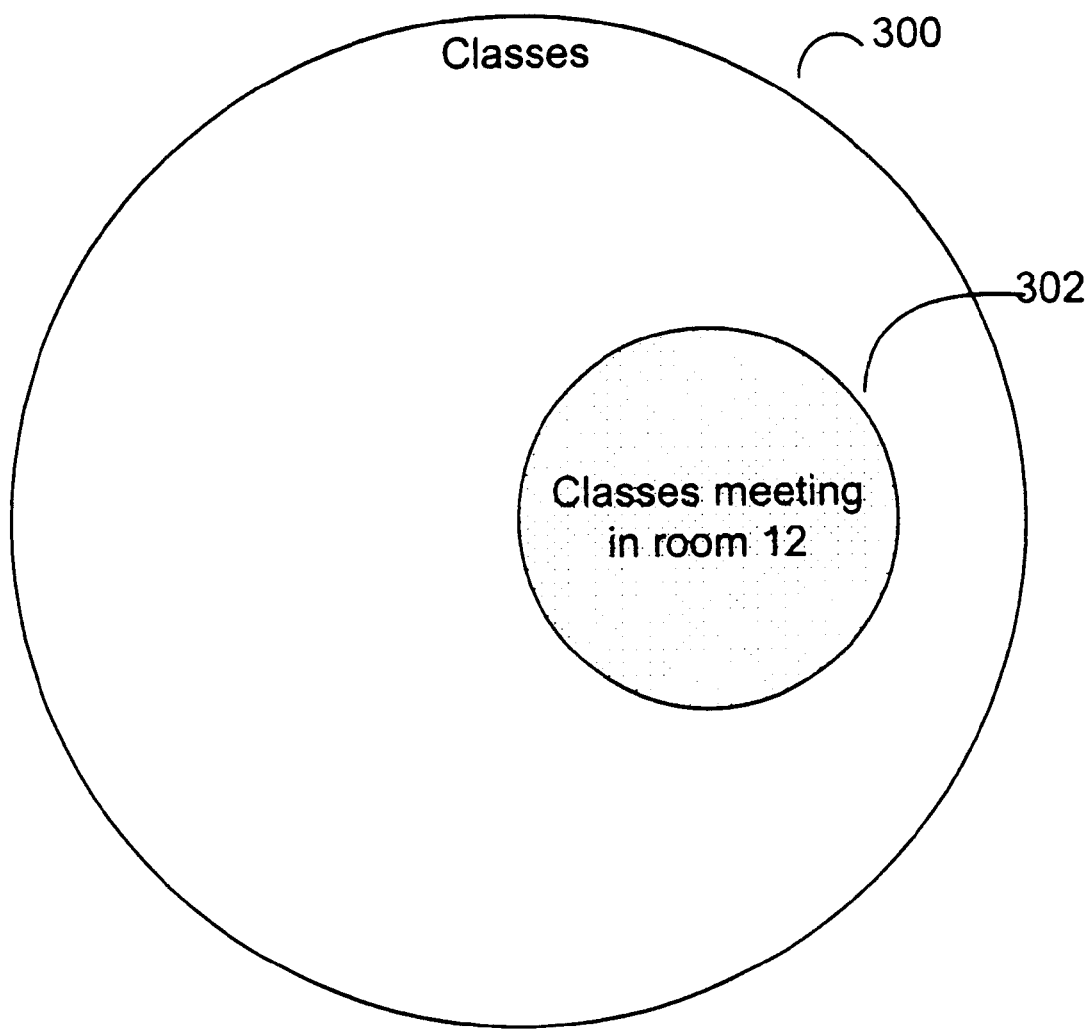
FIG. 3 is a diagram conceptually illustrating a second example query object.

The query object selects particular records by starting with all of the records in the base table (e.g., students) as a set and restricting the set by any added clauses. In the above example, the query object would restrict the returned records to those having a city field of "Boston." This is done by constructing an SQL query string that issues against the database. In this case, the query string is "SELECT * FROM Students WHERE City='Boston'." The set of records returned by this query string is illustrated in FIG. 2 as an area 202 contained in an area 200, which represents the students table. Similarly, considering a table of classes with name, room, time, and other information, the set of all classes meeting in, for example, room 12 can be obtained by creating a query object based on the classes table and adding a clause of "Room='12'." In this case, the query object starts with all of the records in the base table, the classes table, and restricts the returned records to those having a room field with a value of "12." Thus, in this case, the query object constructs an SQL query string of the form "SELECT * FROM Classes WHERE Room='12'." The records returned by this query string are depicted in FIG. 3 as an area 302 contained in an area 300, which represents the classes table.

Figure 4:
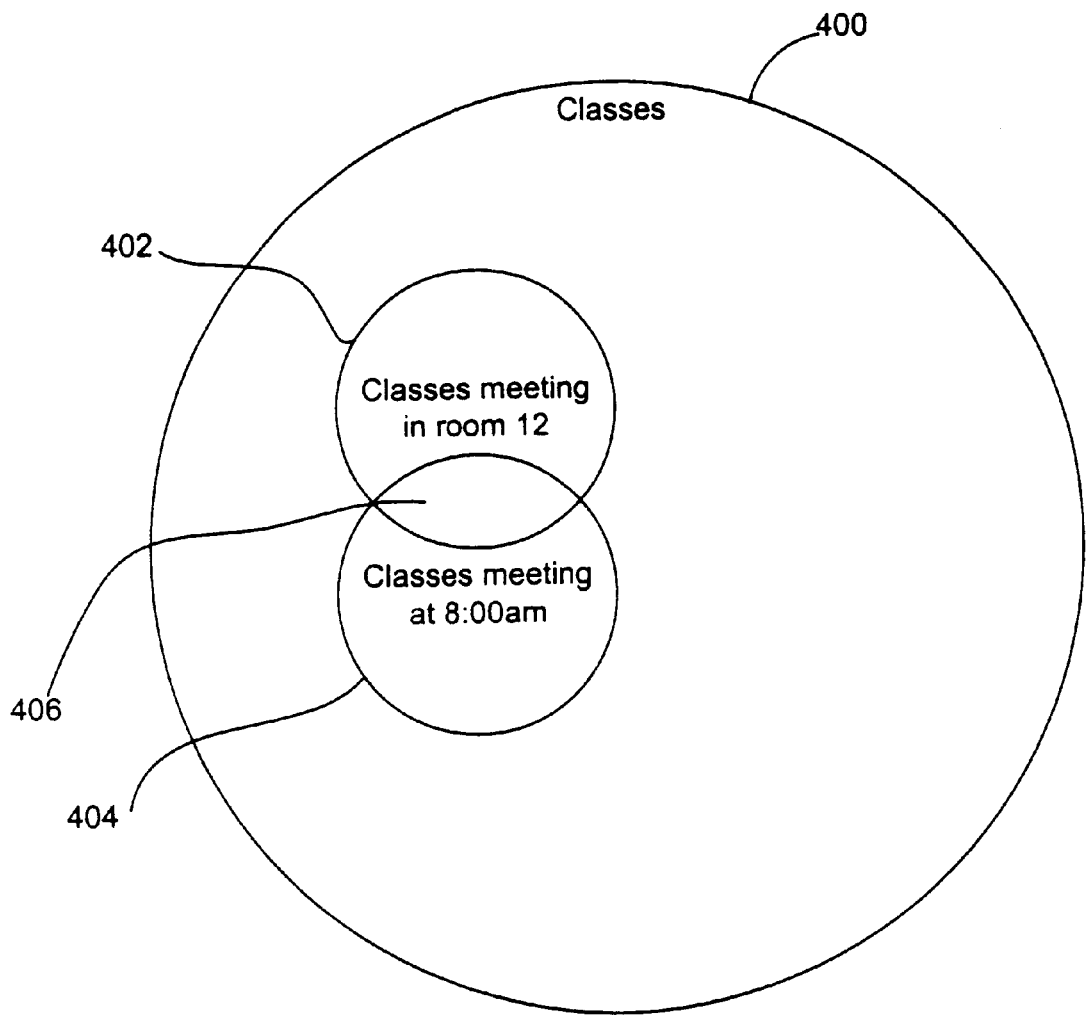
FIG. 4 is a diagram conceptually illustrating a third example query object.

Multiple clauses can be added to a query object to restrict the set of returned records further. For example, to obtain the records corresponding to classes that meet in room 12 at 8:00am, another clause, "Time=8:00am," can be added to the above query object. This query object would build an SQL query string of the form "SELECT * FROM Classes WHERE Room='12' AND Time='8:00am'." FIG. 4 conceptually illustrates the records returned by this query string as an intersection area 406 formed by the intersection of areas 402 and 404 and contained within an area 400 that represents the classes table.

Figure 5:
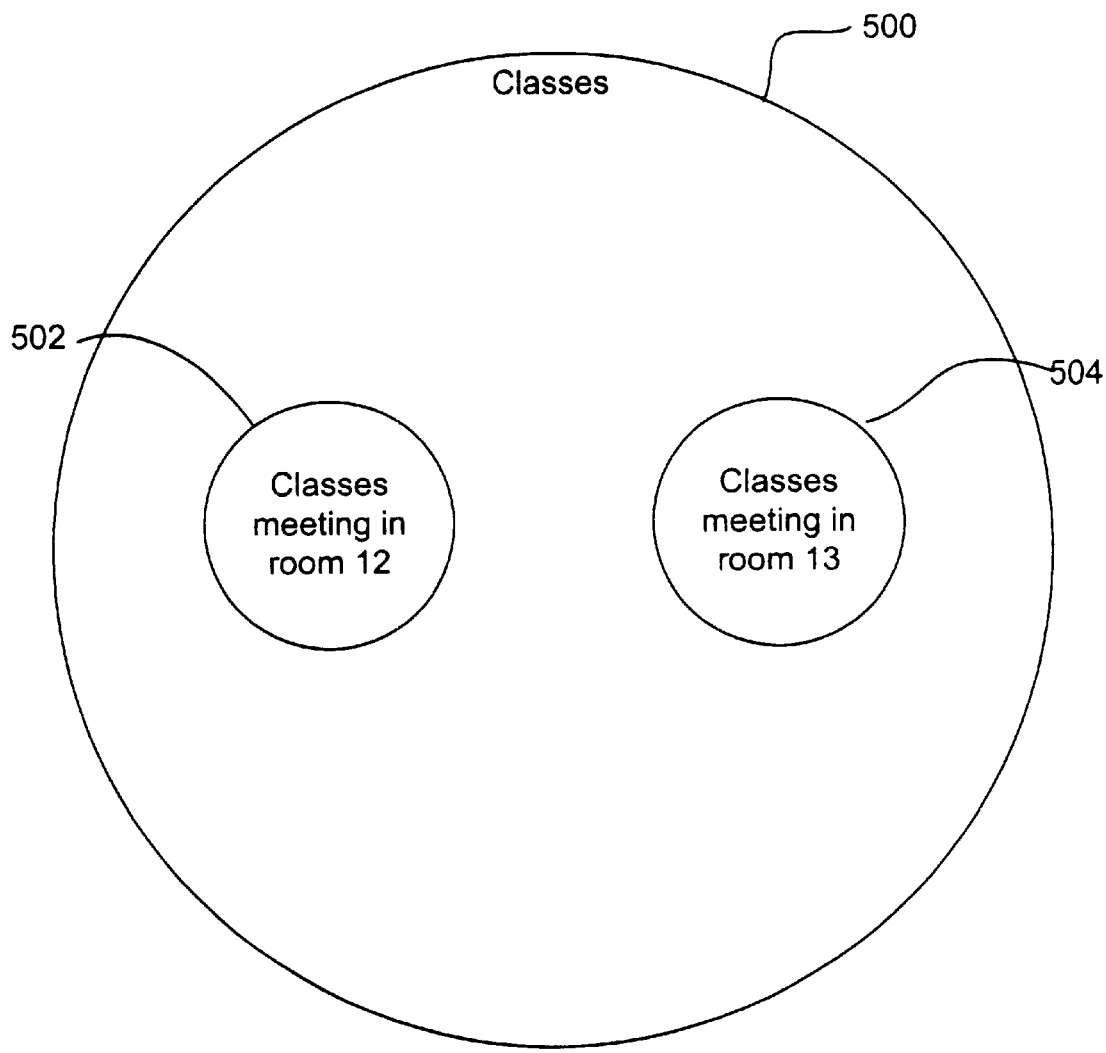
FIG. 5 is a diagram conceptually illustrating a fourth example query object.

Multiple clauses can also be used to expand the set of returned records. To illustrate this application of a query object, it is helpful to consider a scenario in which the user wishes to obtain the records corresponding to the classes that meet in either room 12 or room 13. To retrieve these records, two clauses are used: "Room='12'" and "Room='13'." These clauses are respectively represented by areas 502 and 504 of FIG. 5. Both areas 502 and 504 are contained in an area 500, which represents the classes table. The difference between this example and the previous example, however, is that, in the previous example, the clauses are connected with an AND operator. By contrast, in this example, the two clauses would be connected with an OR operator. The resulting SQL query string would be "SELECT * FROM Classes WHERE Room='12' OR Room='13'" and would return the records in the classes table having a room field with a value of either "12" or "13." Thus, in contrast to FIG. 4, the records returned by this query string are represented not by an intersection area, but by the combination of areas 502 and 504.

In addition to the AND and OR operators, AND-NOT and OR NOT clause operators can be used to connect clauses to one another. In each case, the query object builds an appropriate SQL query string based on the clauses and on the clause operator or operators.

According to one example implementation of the present invention, operators known as query operators are used to construct query strings based on two or more query objects. This implementation is particularly useful in creating complex queries that reference more than one table in the database.

Figure 6:
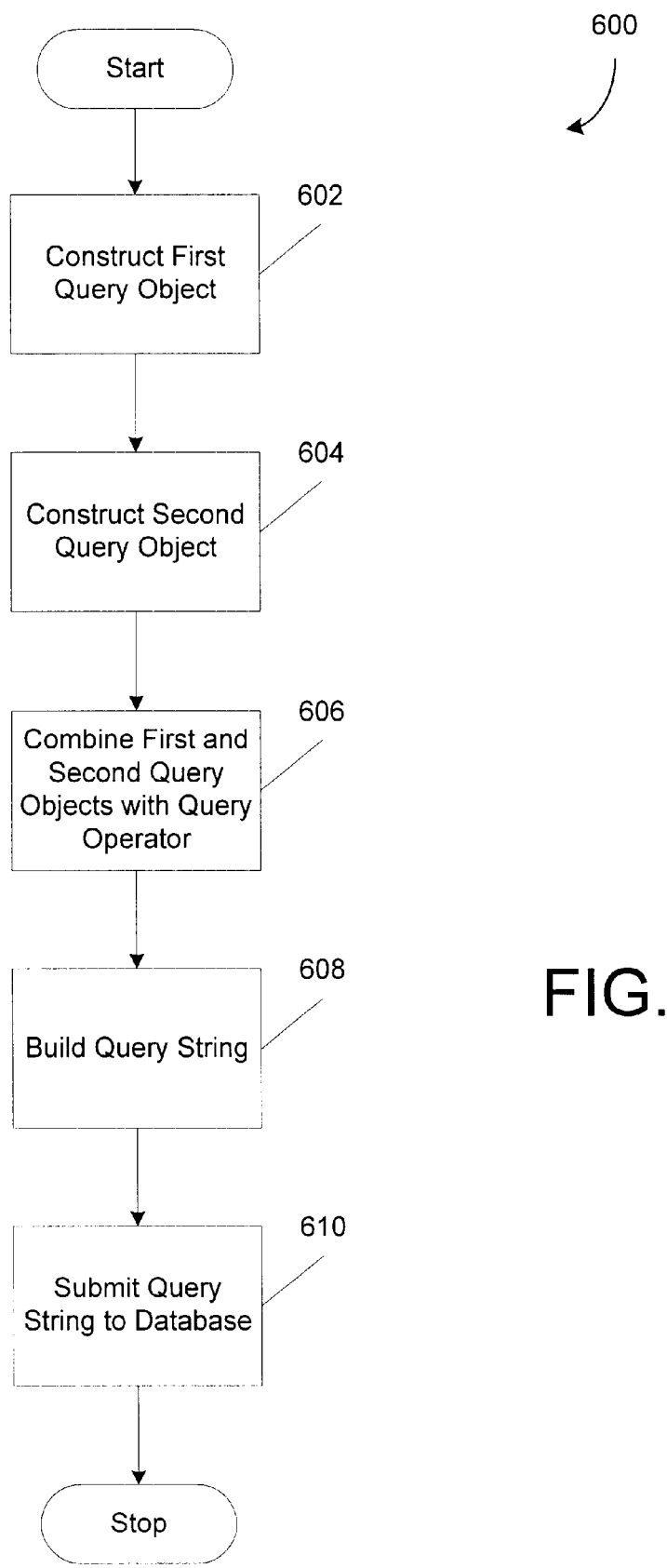
FIG. 6 is a flowchart illustrating a method for retrieving selected information from a database, according to an example implementation of the present invention.

FIG. 6 is a flowchart depicting an example method 600 for retrieving information from an electronic database, according to one particular embodiment of the present invention. At a block 602, a query object is constructed. This query object contains one or more clauses related to one another through clause operators. Another query object is constructed at a block 604; this query object also contains one or more clauses interrelated through clause operators. Next, at a block 606, the two query objects are combined to form a third query object using a query operator that defines how the third query object is to be formed. As more fully discussed below in connection with FIGS. 14–16, several types of query operators can be defined to relate the query objects to one another in different ways. The particular way in which the two query objects are combined to form the third query object is determined by the particular query operator. After the third query object is generated, it is used as the basis for creating an SQL query string at a block 608. At a block 610, the resulting SQL query string is then submitted to the database, which returns the desired information.

Figure 7:
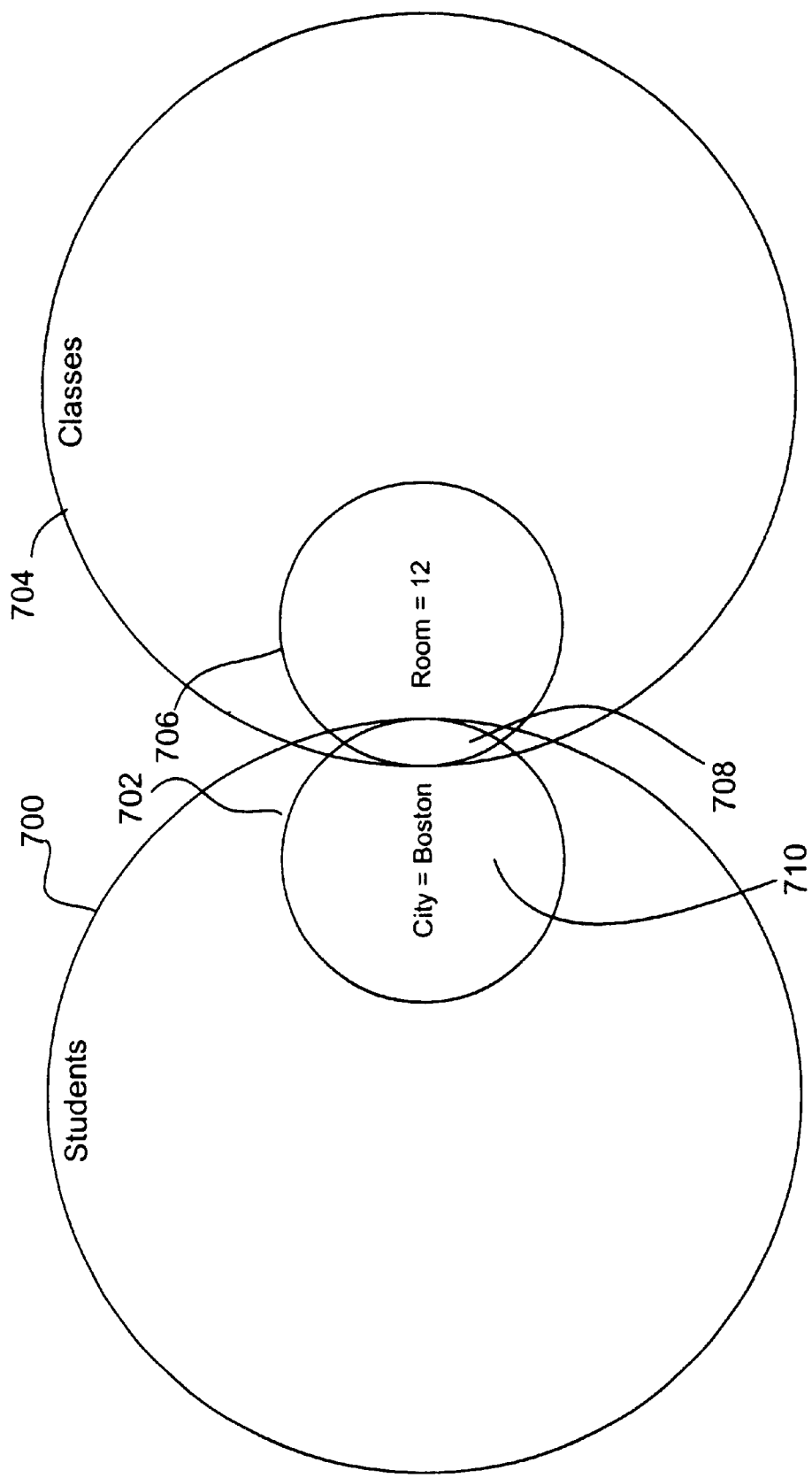
FIG. 7 is a diagram conceptually illustrating a fifth example query object.

As an operational example, using the above-described students and classes tables, query objects can be used to return a list of all the students who live in Boston and who are in a class that meets in room 12. To create the correct SQL query string, two query objects are constructed: one based on the students table, and the other based on the classes table. The query object based on the students table has a clause of "City='Boston'," while the query object based on the classes table has a clause of "Room='12'." These query objects are represented in FIG. 7 as areas 702 and 706, respectively. Area 702 is contained within an area 700 representing the students table, and area 706 is contained within an area 704 that represents the classes table.

In this implementation, the two query objects are operands of an intersection query operator. To handle this case, the query object has an intersection method that builds a third query object that has all of the clauses from the first query object, e.g., the query object based on the students table, and an additional clause that is a subquery of the second query object. Thus, in this particular example, the query string that is created is "SELECT * FROM Students WHERE City='Boston' AND StudentID IN (SELECT StudentID FROM StudentsClasses JOIN Class ON StudentsClasses.ClassID=Classes.ClassID WHERE Classes.Room='12')." The records returned by this query string are represented in FIG. 7 as an intersection area 708 formed by the intersection of areas 702 and 706. In a conventional two-tier database system, the user would have to know that the students table is related to the classes table through a third table called StudentsClasses in order to build this query string. The clause-based method of the present invention obviates this need, such that the user need not know how the tables are related to each other. The knowledge that the user would otherwise have to possess is encapsulated in the query object.

Another query operator, according to another particular implementation, is an intersect-complement query operator. This type of query operator is useful in forming queries in which one of the restrictions on the returned records is negative. For example, again using the students table and the classes table described above, the intersect-complement query operator can be used to generate a list of students who live in Boston, but do not attend a class that meets in room 12. The two query objects would be similar to the query objects of the above example provided in connection with the intersection query operator. In this case, however, the query objects are operands of an intersect-complement query operator. To handle this case, the query object has an intersect-complement method that works similarly to the intersect method, except that the clause operator is set to AND-NOT, rather than AND, for the clause immediately before the subquery clause. Thus, in this example, the resulting SQL query string is "SELECT * FROM Students WHERE City='Boston' AND-NOT StudentID IN (SELECT StudentID FROM StudentsClasses JOIN Classes ON StudentsClasses.ClassID=Classes.ClassID WHERE Classes.Room='12')." The records returned by this query string are illustrated in FIG. 7 as an area 710, formed by the portion of area 702 that is not also contained in area 706.

According to another particular implementation of the present invention, clauses can be grouped together to form complex queries. For example, one such query might be for a list of students who live in either Boston or Seattle and who are less than 21 years old. To facilitate creating this type of query, the query object has a ClauseGroupStart method and a ClauseGroupEnd method. These methods act analogously to grouping operators, e.g., parentheses, changing the grouping levels within the query object. In this way, when the clauses are added to the query object, the query object can group them in the correct manner.

Figure 8:
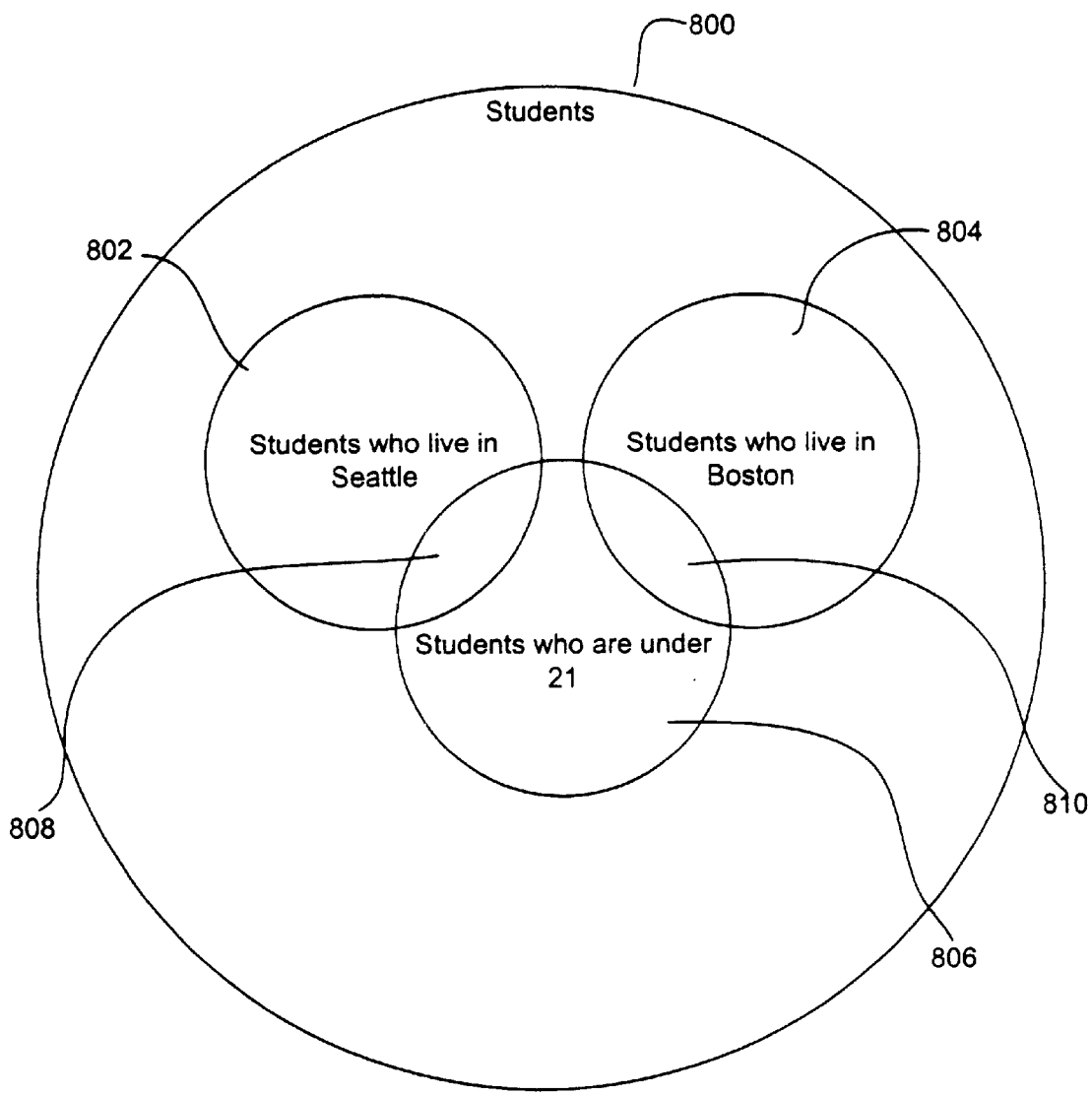
FIG. 8 is a diagram conceptually illustrating a sixth example query object.

In this example, to create a query object for the above query, a query object is created based on the students table. Next, the ClauseGroupStart method is called to indicate the beginning of a clause grouping. A ClauseAdd method is then called to add the "City='Boston'" clause, and then is called again to add the "City='Seattle'" clause with an OR clause operator. FIG. 8 conceptually illustrates these clauses as areas 804 and 802, respectively, contained in an area 800 that represents the students table. The ClauseGroupEnd method is then called to indicate the end of the clause grouping. Finally, the ClauseAdd method is again called to add the "Age<21" clause with an AND clause operator. Area 806 of FIG. 8 represents this clause. The resulting SQL query string generated by the query object would be "SELECT * FROM Students WHERE (City='Boston' OR City='Seattle') AND Age<21." The records returned by this query string are represented by intersection areas 808 and 810. Without the clause grouping operators, it might not be clear whether the "City='Seattle'" clause should be grouped with the "City='Boston'" clause or with the "Age<21" clause.

Figure 9:
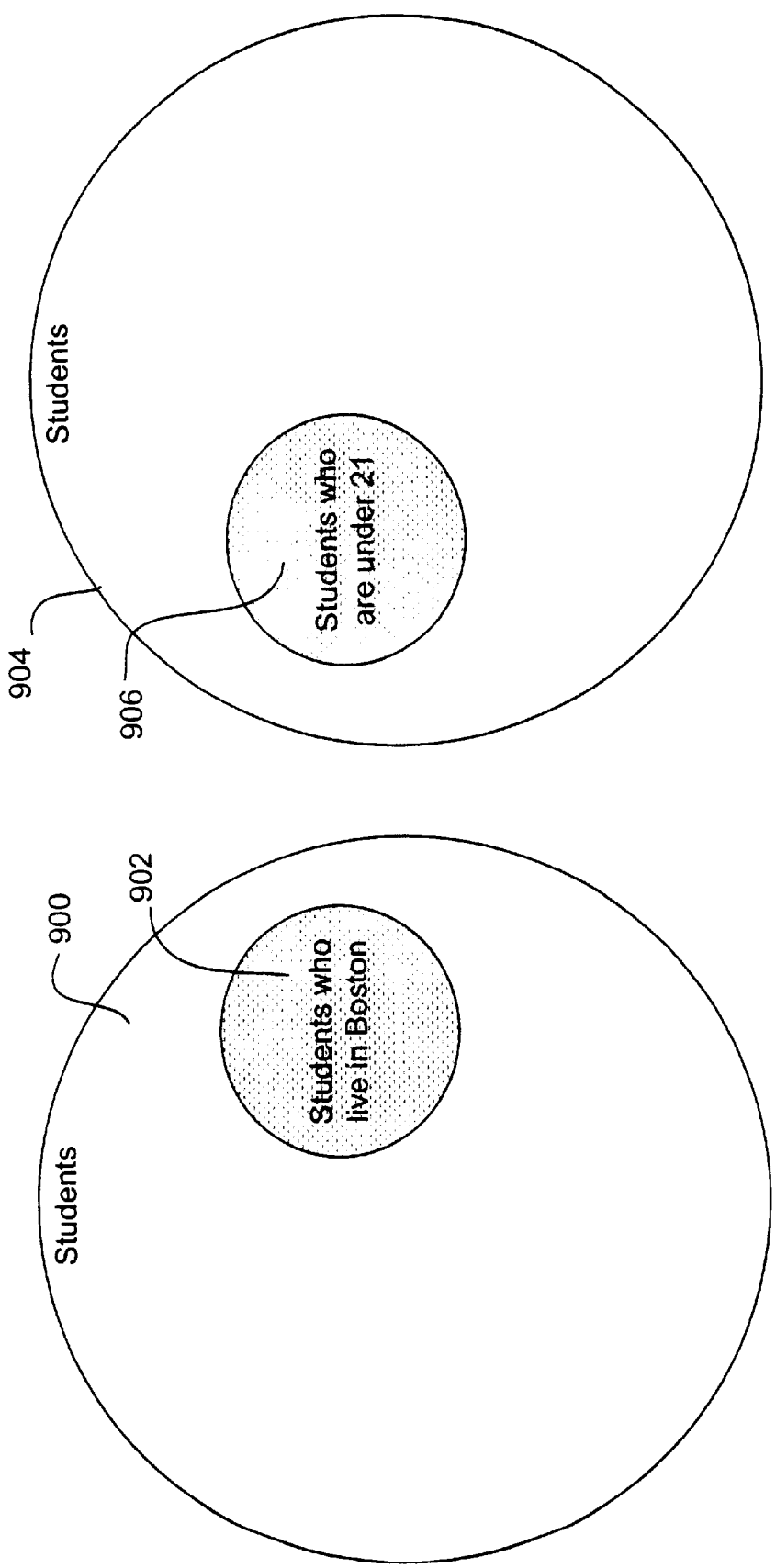
FIG. 9 is a diagram conceptually illustrating a seventh example query object.
Figure 10:
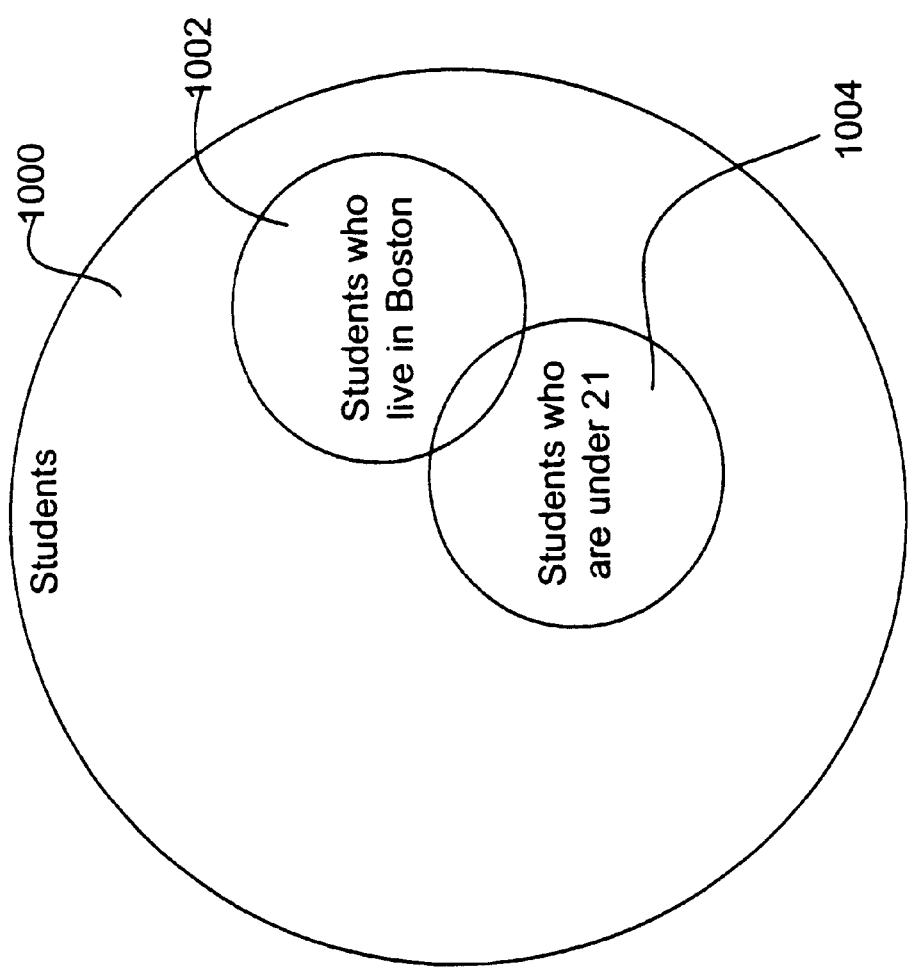
FIG. 10 is a diagram conceptually illustrating an eighth example query object.

According to still another embodiment of the present invention, a union query operator facilitates the combination of two query objects that are based on the same table into a single query object. To implement this query operator, the query object contains a Union method that receives as operands two query objects and generates a single query object that has the clauses of the operand query objects. For example, consider two query objects based on the student table, one with a clause of "City='Boston'" and the other with a clause of "Age<21." FIG. 9 conceptually depicts these query objects as areas 902 and 906, respectively contained in areas 900 and 904, both of which represent the students table. These query objects can be combined with the Union method into a single query object, also based on the students table, with both clauses. In the case of the union query operator, the two clauses would be connected with an OR query operator. Thus, the resulting SQL query string generated by the query object would be "SELECT * FROM Students WHERE City='Boston' OR Age<21." FIG. 10 conceptually illustrates the union of the two query objects into a single query object. In FIG. 10, the first query object is represented by an area 1002, while the second is represented by an area 1004. Both of these areas are contained in an area 1000, which represents the students table. The records returned by the query string in this example are represented by the combination of areas 1002 and 1004, namely, those portions of area 1000 that are in area 1002, area 1004, or both. While FIG. 10 depicts the areas 1002 and 1004 as intersecting, it will be appreciated that areas 1002 and 1004 need not necessarily intersect. That is, it may be that there are no students under 21 who live in Boston. It should be noted that the same result can be obtained by simply adding the "Age<21" clause to the first query object, connected with an OR clause operator.

Figure 11:
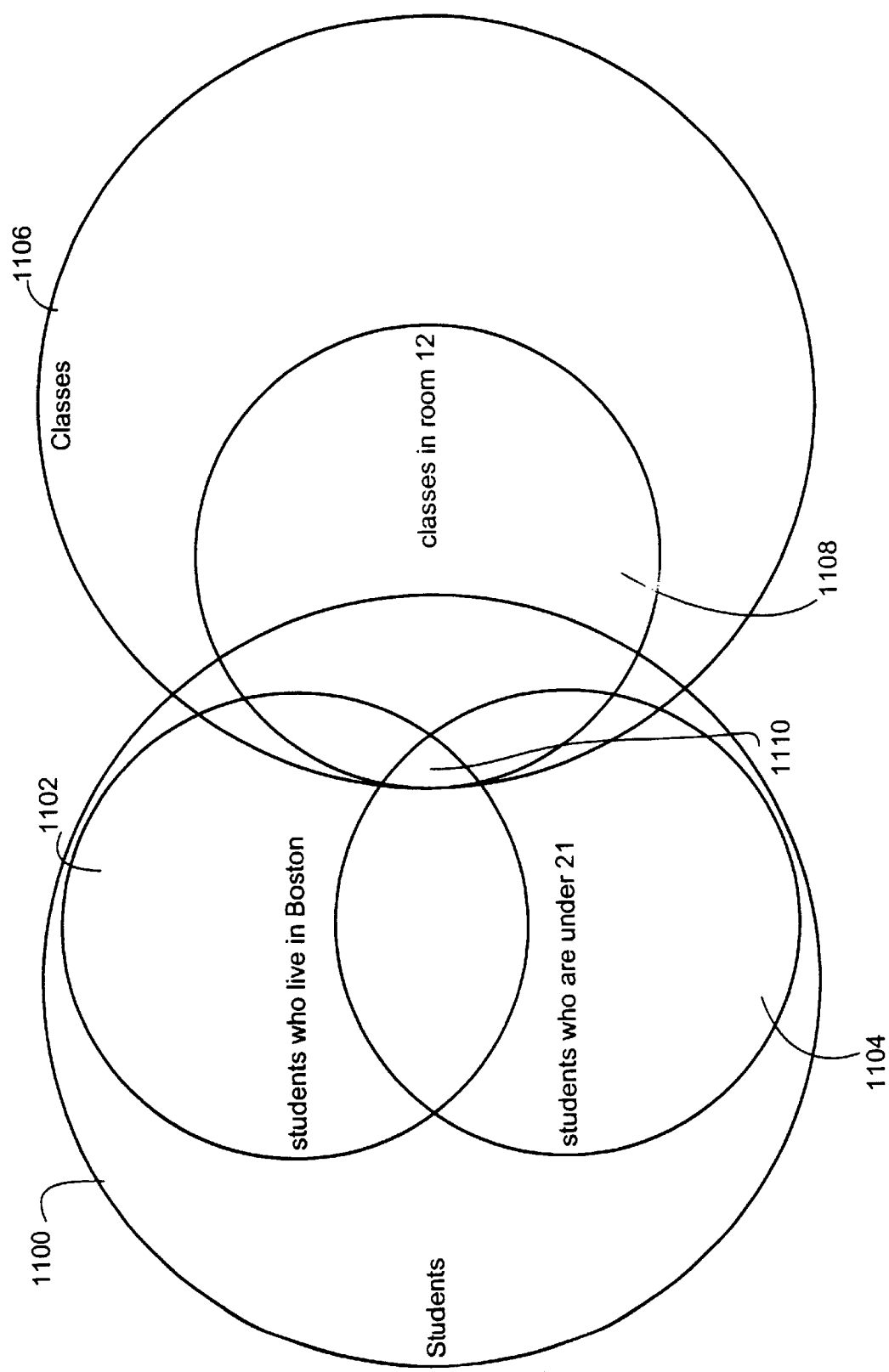
FIG. 11 is a diagram conceptually illustrating a ninth example query object.

The advantages of the union query operator are readily apparent when relatively complex query objects are combined. For example, consider a first query object based on the students table and having clauses for "City='Boston'" and "Age<21," connected by an AND clause operator, that has been intersected with a query object based on the classes table and having a clause "Room='12'." FIG. 11 conceptually depicts this first query object as an intersection area 1110 of areas 1102, 1104, and 1108, contained in the intersection of areas 1100 and 1106, representing the students and classes tables respectively. The intersection area 1110 thus represents students under 21 who live in Boston, and who are enrolled in classes meeting in room 12.

Figure 12:
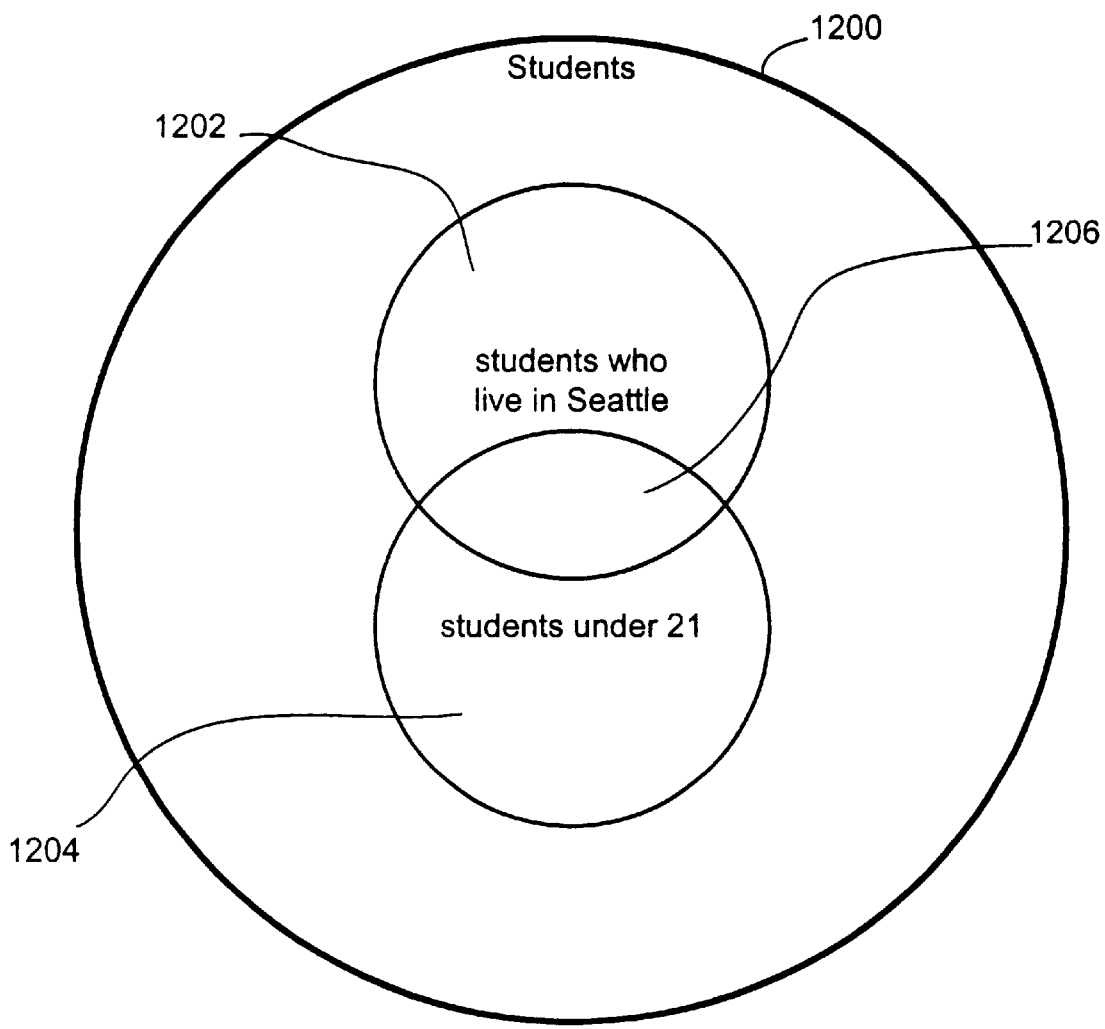
FIG. 12 is a diagram conceptually illustrating a tenth example query object.

Consider also a second query object based on the students table and having clauses for "City='Seattle'" and "Age<21," connected by an AND clause operator. This second query object is depicted in FIG. 12 as an intersection area 1206 of areas 1202 and 1204 within an area 1200 representing the students table. Thus, intersection area 1206 represents students under 21 who live in Seattle.

Figure 13:
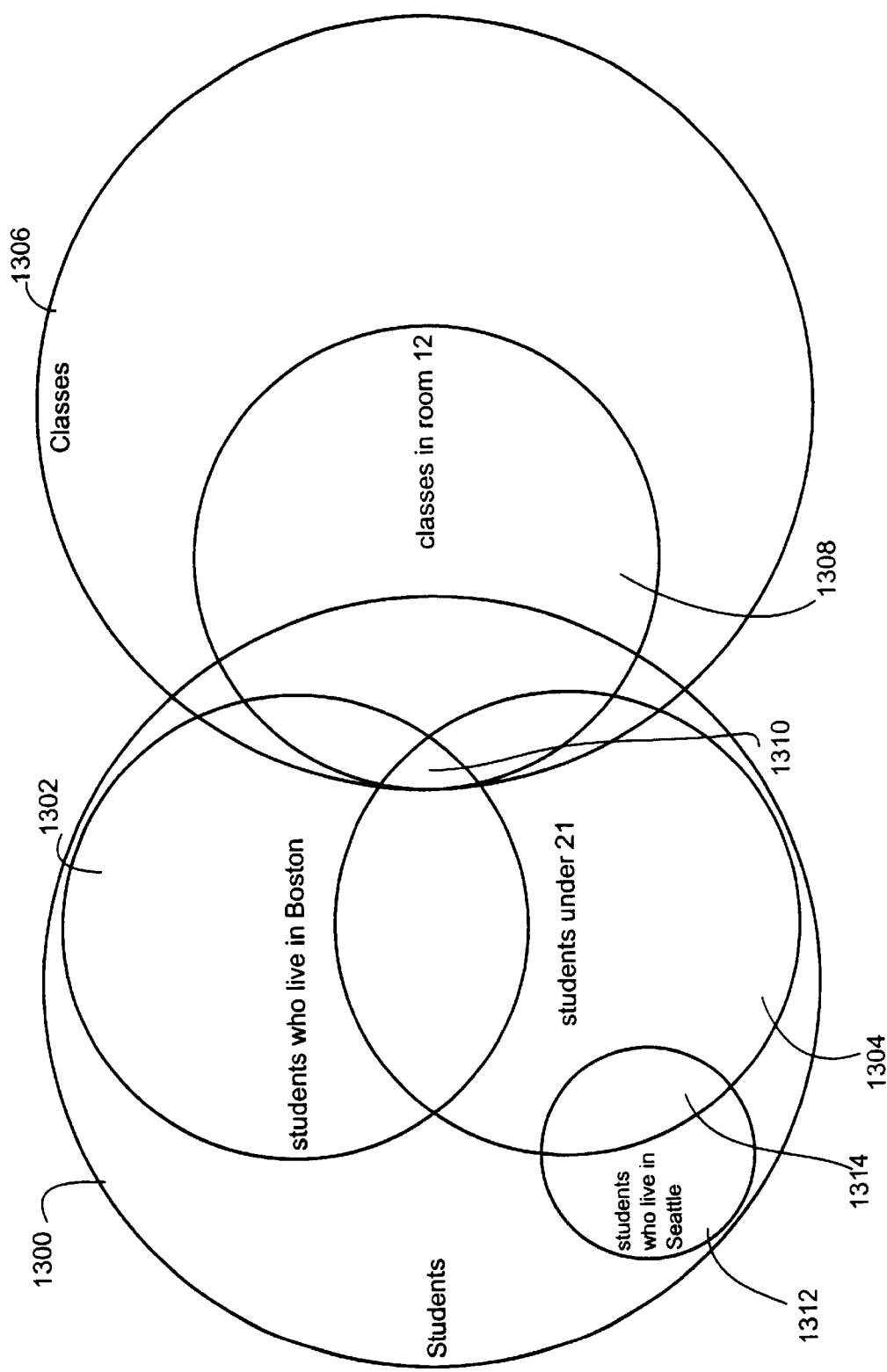
FIG. 13 is a diagram conceptually illustrating an eleventh example query object.

Connecting these two query objects with a union query operator results in the creation of a query object having the clauses "City='Boston'" and "Age<21", connected by an AND clause operator; "StudentID IN '(SELECT StudentID FROM StudentsClasses JOIN Classes ON StudentsClasses.ClassID=Classes.ClassID WHERE Classes.Room='12')'" with an AND clause operator; "City='Seattle'" with an OR clause operator; and "Age<21" with an AND clause operator. The returned set is conceptually depicted in FIG. 13 as intersection areas 1310 and 1314. Intersection area 1310 is formed by the intersection of areas 1302, 1304, and 1308 and exists in the intersection of areas 1300 and 1306 representing the students and classes tables, respectively. Thus, intersection area 1310 represents students under 21 who live in Boston, and who are enrolled in classes meeting in room 12. Intersection area 1314 occurs within the area 1300, which represents the students table, and is formed by the intersection of area 1304 and area 1312. Accordingly, intersection area 1314 represents students under 21 who live in Seattle. Together, intersection areas 1310 and 1314 represent students under 21 who either live in Boston and are enrolled in classes meeting in room 12, or live in Seattle.

The present invention can be implemented in a number of ways. A simple way of implementing the present invention involves using the query objects as SQL builders that can be invoked by other applications to obtain a select string. This select string can then be used to retrieve data from the server.

In another embodiment of the present invention, a three-tier method is used to build an object oriented middle tier around the query objects. In this method, a class is defined for each table in the database. Each class has a property for each field in the corresponding table. For example, considering the students table described in connection with the operational examples discussed above in connection with FIGS. 2–5 and 7–13, a class would be created for the students table. If the students table has fields labeled ID, Name, Address, City, and Classes, the class would have a property for each of these fields. In addition, each class has Initialization and Save methods for retrieving from and updating the underlying data tables. A complete middle tier is formed by adding to the query object a GetCollection method that returns a collection of objects, one object for each record returned when the query object's resulting select string is executed. Similarly, an object would also be created for the classes table and would have the appropriate properties, as well as Initialization and Save methods.

These query objects are used to retrieve and update data in the underlying data tables corresponding to them. For example, for any given class, the Students property query object is used to obtain a collection of all the classes for a particular student. Similarly, for any given student, the Classes property query object is used to get a collection of all the classes for that student. When the Save method is called on either a Student object or a Class object, the properties that are reflections of fields are written to the record in the database, and, for the query object properties, a record is added to the StudentsClasses relationship table for each item in the collection returned by a call to the GetCollection method of the query object. When the Initialization method is called, the reflective properties are filled in from the record in the database, and the query object property has a clause added for each appropriate record in the StudentsClasses table.

Making these properties query objects rather than actual collections saves having to retrieve data for all of the records until the data is actually needed. Because the detailed information for a class is often needed without needing to know all of the students who are in the class and, conversely, the detailed information for a student is often needed without needing to know all of the classes in which the student is enrolled, a significant improvement in performance can often be realized by avoiding unnecessary retrieval of information.

Each query object has a number of properties. One such property, a base object type, defines which table the query object queries. Another property is known as ForceEmpty and is used to determine whether a query object without any clauses should return all of the records in the underlying data table or none of the records. A clauses property is a read-only property that returns the collection of clauses that is used when a query object is passed to an intersect method call, an intersect-complement method call, or a union method call.

In addition to properties, each query object also contains a number of exposed methods. Some of these methods facilitate working with clauses in the query object. For example, a ClauseAdd method adds a field-comparison clause to the collection of clauses, with its properties set to the values passed to the ClauseAdd method. ClauseGroupStart and ClauseGroupEnd methods are used to define groupings of clause, as described above in connection with FIG. 8. The.ClauseGroupStart method adds a token clause that denotes the beginning of a grouping. Similarly, the ClauseGroupEnd method adds a token clause that denotes the end of a grouping. In addition to these clause-related methods, a ClausesClear method removes all of the clauses from a query object, such that the query object returns all or none of the records from the underlying table, depending on the setting of the ForceEmpty property.

Each query object also has a number of associated functions. One such function, labeled GetCollection, returns a collection of objects, one object for each row of the database that meets the criteria of the clauses. Other functions implement the query operators. These functions include Intersect and IntersectComplement functions, discussed above in connection with FIG. 7, and a Union function, discussed above in connection with FIGS. 8 and 9.

Figure 14:
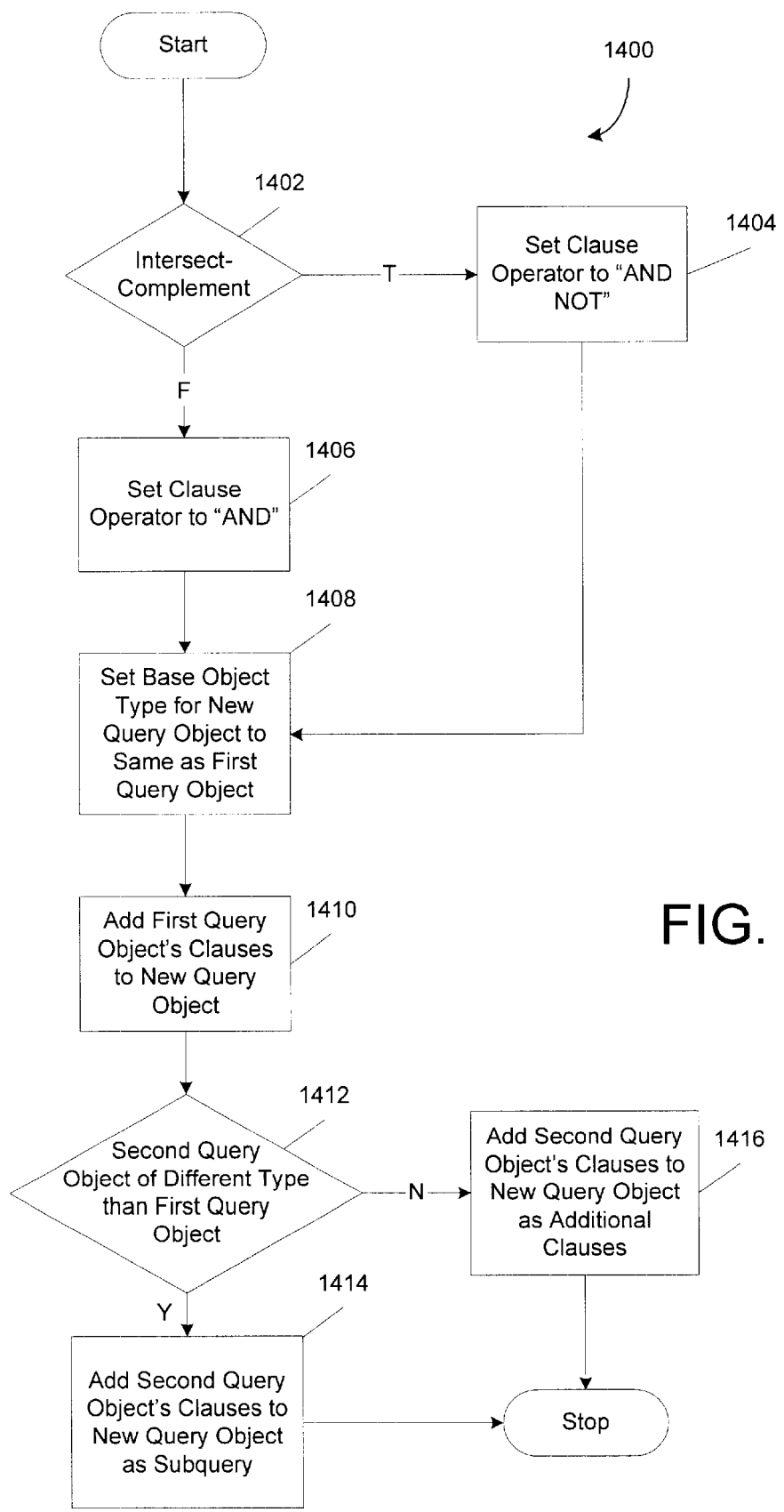
FIG. 14 is a flowchart depicting an example process, according to a particular implementation of the present invention.

In one embodiment of the present invention, the Intersect and IntersectComplement functions are both implemented using a single function labeled IntersectOrComplement, conceptually depicted as a flowchart in FIG. 14. The IntersectOrComplement function receives a Boolean parameter that is true if an intersect operation is intended and false if an intersect-complement operation is intended.

FIG. 14 illustrates an example method 1400 for implementing the IntersectOrComplement function. At a decision block 1402, the Boolean parameter is evaluated. If it has a value of true, the clause operator is set to AND-NOT at a block 1404. Otherwise, the clause operator is set to AND, as depicted at a block 1406.

Next, at a block 1408, the base object type for a new query object is set to the base object type of the first query object, i.e., the query object containing the IntersectOrComplement function. The clauses of this query object are then added to the collection of clauses for the new query object, as illustrated at a block 1410. These clauses are grouped together as a first clause group.

The clauses of the second query object are then added to this collection of clauses. The manner in which they are added depends on the base object type of the second query object. At a decision block 1412, it is determined whether the two operand query objects are of different base object types. If they are, then a subquery intersection is indicated, and the second query object's clauses are added to the new query object as a subquery of the query represented by the first query object, as depicted at a block 1414. On the other hand, if the operand query objects are of the same base object type, the second query object's clauses are added to the new query object as additional clauses instead, as shown at a block 1416.

Figure 15:
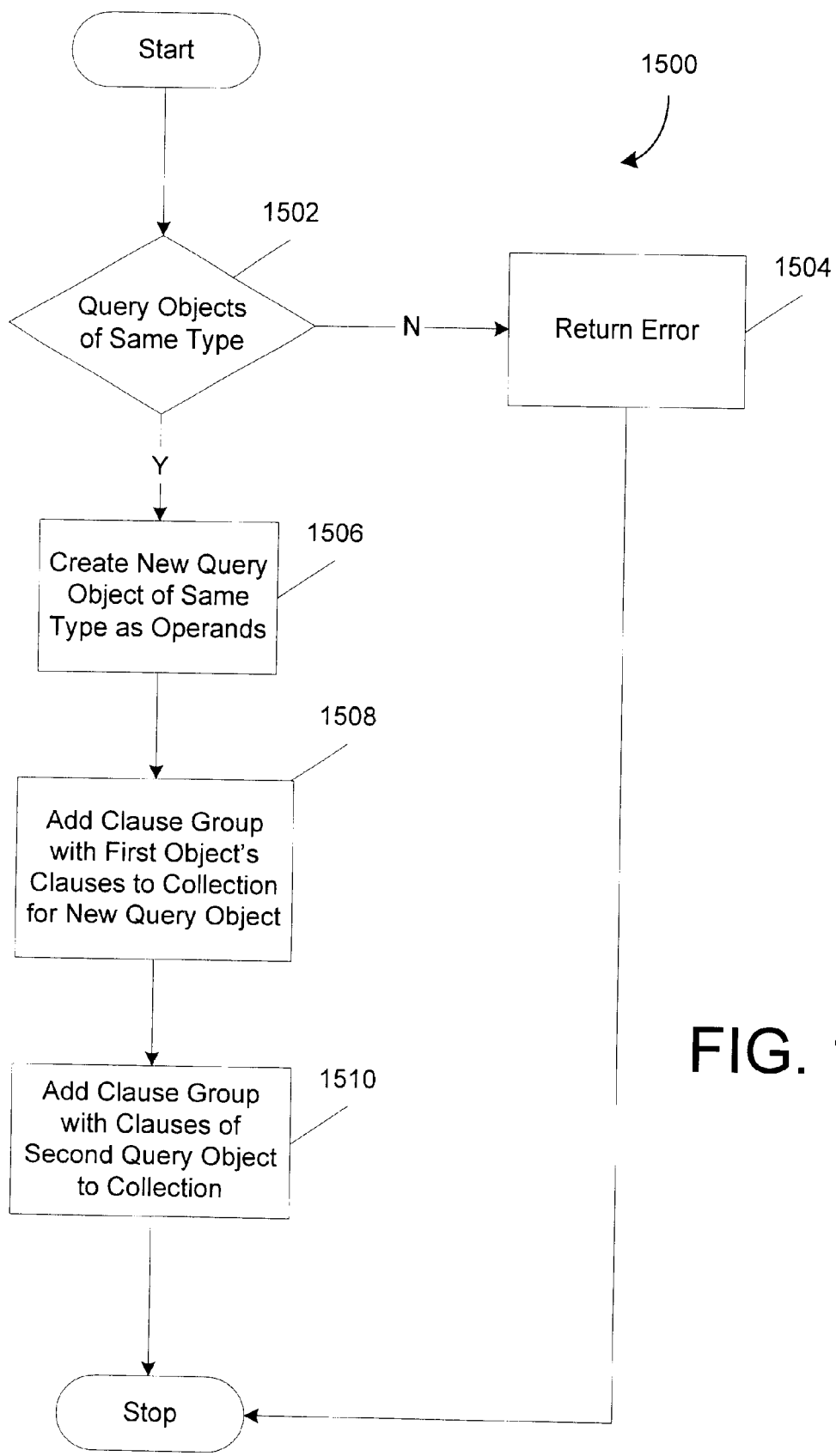
FIG. 15 is a flowchart depicting an example process, according to another particular implementation of the present invention.

FIG. 15 depicts an example method 1500 for implementing the Union function. First, at a decision block 1502, it is determined whether the query object operands are of the same base object type. If not, the Union function returns an error with an explanation that the query objects must be of the same base object type to be combined with the Union operator, as illustrated at a block 1504. Assuming the query object operands are of the same base object type, a new query object of this base object type is created at a block 1506. Next, at a block 1508, all of the first query object's clauses are added to the collection for the new query object as a clause group. After the first query object's clauses are added to the collection, the clauses of the second query object added. At a block 1510, the second query object's clauses are added to the collection as a clause group. An OR clause operator precedes this clause group. At blocks 1508 and 1510, when clauses are added to the collection for the new query object, groupings and clause operators are preserved.

Each query object also contains various internal subroutines and functions that are not exposed. One such internal function is the IntersectOrComplement function, described above in connection with FIG. 14. Another is a ProcessClausesIntoWhere function, which traverses all of the clauses and creates the WHERE portion of the SQL query string used to get the data.

Figure 16:
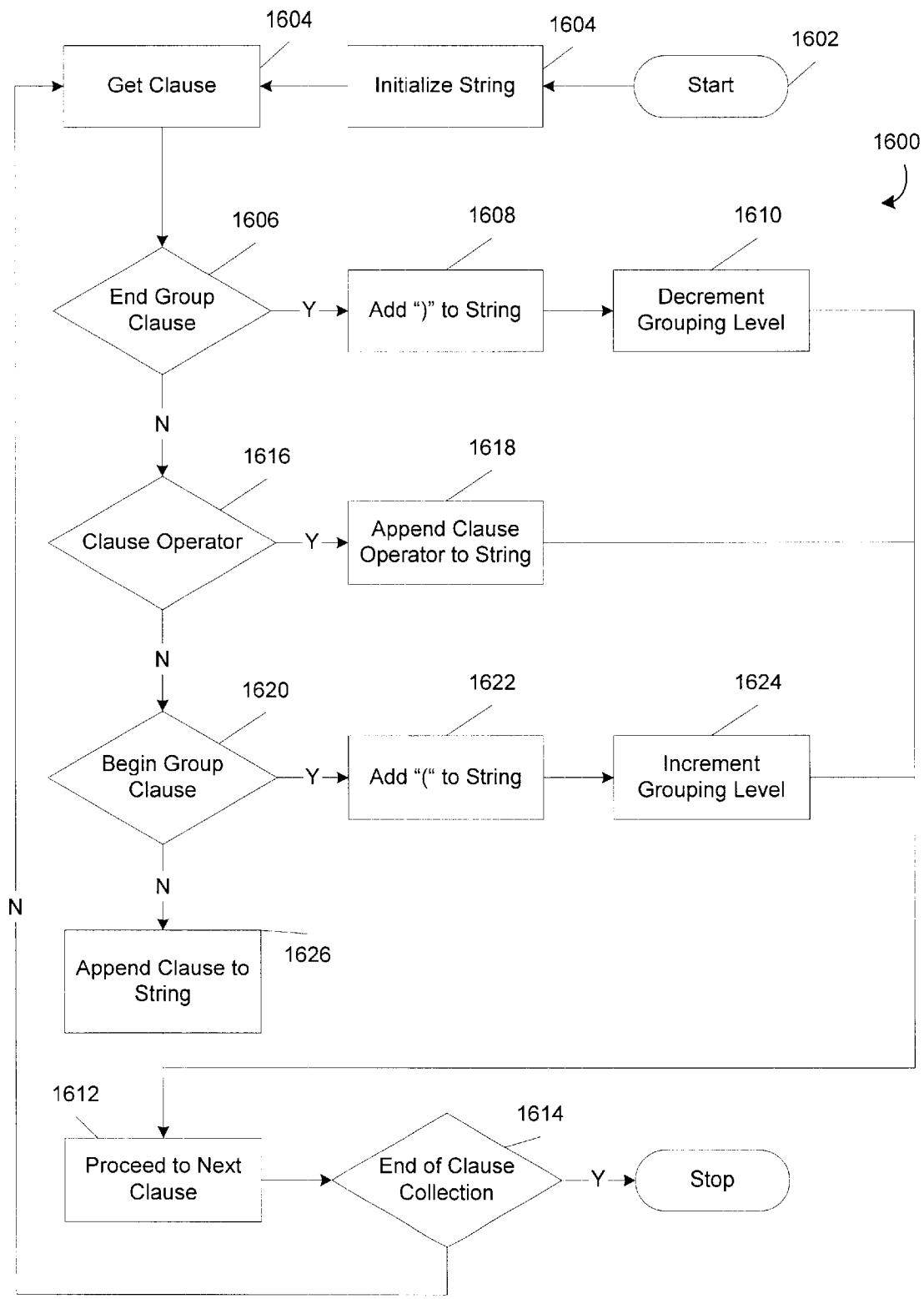
FIG. 16 is a flowchart depicting an example process, according to yet another implementation of the present invention.

FIG. 16 is a flowchart depicting an example method 1600 for implementing the ProcessClausesIntoWhere function. In this method 1600, a string is first initialized as a zero-length string, as depicted at a block 1602. This string is used to build the WHERE portion of the SQL query string. Next, at a block 1604, the collection of clauses is traversed to obtain the first clause. At a decision block 1606, it is determined whether the clause is an end group token clause. If so, a right parenthesis is appended to the string at a block 1608. A grouping level is decremented at a block 1610, after which the next clause is analyzed, as depicted at a block 1612. It is then determined whether the end of the clause collection has been reached at a decision block 1614. If not, flow then returns to block 1604, at which the collection of clauses is traversed to obtain the next clause.

If the clause is not an end group token clause, execution proceeds to a decision block 1616, at which it is determined whether the clause is a clause operator token clause. If it is, an appropriate clause operator is appended to the string at a block 1618, and execution proceeds to blocks 1612 and 1614 as described above.

If the clause is not a clause operator token clause, flow proceeds to a decision block 1620, at which it is determined whether the clause is a begin group token clause. If so, a left parenthesis is appended to the string at a block 1622. The grouping level is incremented at a block 1624, after which execution returns to blocks 1612 and 1614. If the clause is neither an end group token clause, a clause operator token clause, or a begin group token clause, the clause is appended to the string at a block 1626.

Other internal functions contained in the query object include functions to set the default values for the query object, to initialize a newly created query object, and to obtain the name of the table against which the query object would query.

Figure 17:
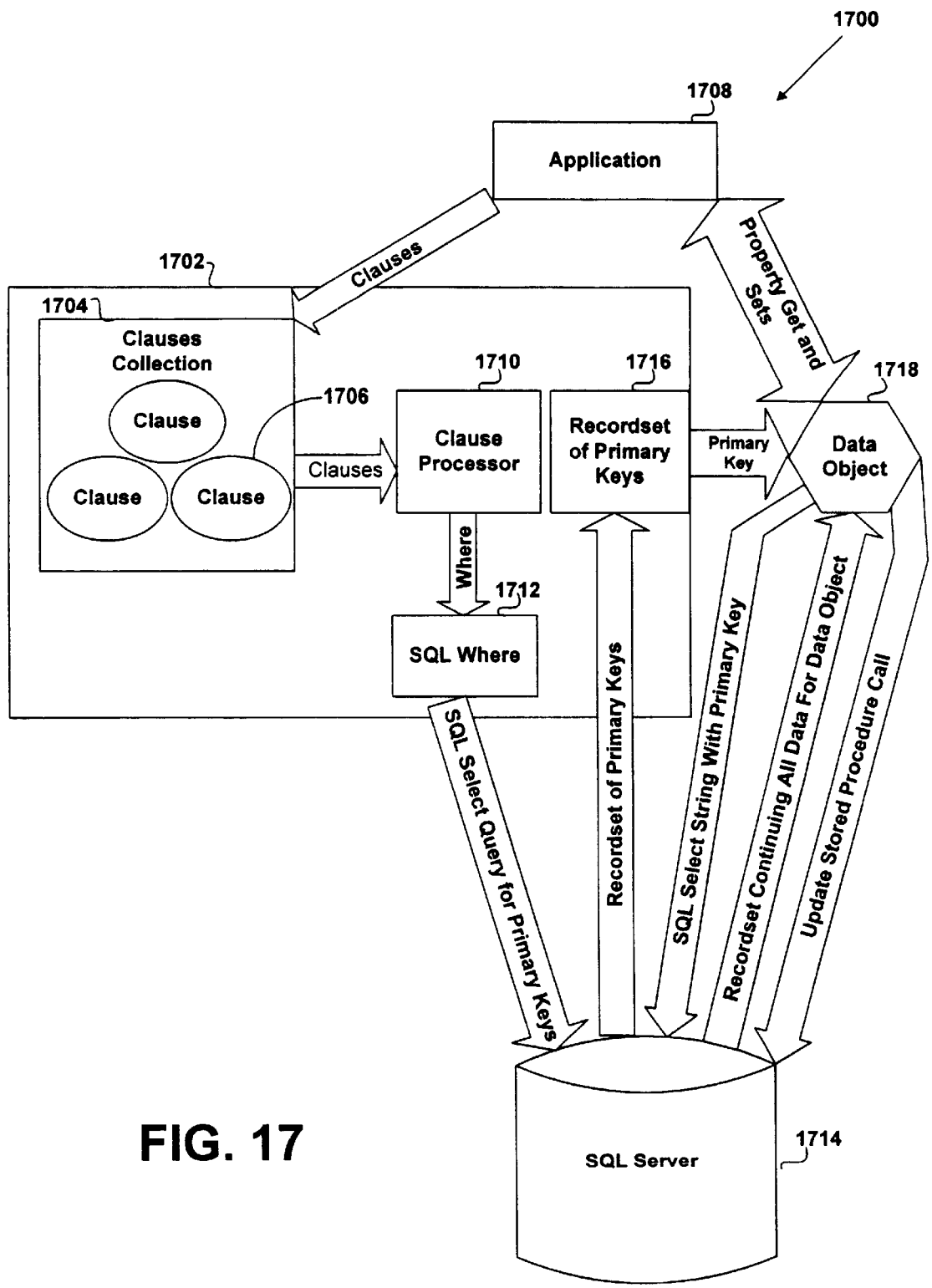
FIG. 17 illustrates an example database system architecture, according to still another implementation of the present invention.

FIG. 17 depicts an example architecture 1700 within which a query object 1702 operates. The query object 1702 includes a clauses collection object 1704 that itself contains a number of clause objects 1706. These clause objects 1706 are added to the clauses collection object 1704 by an application 1708. Within the query object 1702, a clause processor 1710 processes the clause objects 1706 and generates a WHERE portion 1712 of an SQL SELECT string. The query object 1702 then creates a primary key SELECT string using the WHERE portion 1712 and passes the SELECT string to an SQL server 1714. The SQL server 1714, in turn, passes a record set 1716 of the primary keys that meet the criteria of the WHERE portion 1712 back to the query object 1702.

For each primary key object in the record set 1716, the query object 1702 creates a data object 1718 and assigns the primary key to it. The data object 1718 creates a SELECT string for all of the data for its primary key and sends it to the SQL server 1714. The SQL server 1714 returns one or more record sets of all the data for that data object 1718, which sets all of its properties.

The application 1708 can then obtain the values of these properties. It can also update the properties by setting them and calling a data object save method, which causes the data object 1718 to pass its data in an update stored procedure call to the SQL server 1714.

While the embodiments of the invention have been described with specific focus on their embodiment in a software implementation, the invention as described above is not limited to software embodiments. For example, the invention, may be implemented in whole or in part in hardware, firmware, software, or any combination thereof. The software of the invention may be embodied in various forms, such as a computer program encoded in a machine-readable medium, such as a CD-ROM, magnetic medium, ROM or RAM, or in an electronic signal. Further, as used in the claims herein, the term "module" shall mean any hardware or software component, or any combination thereof.

What is claimed is:

1. A computer-implemented method for retrieving selected information from an electronic database, the method comprising:

constructing a first query object and a second query object;

constructing a third query object as a function of the first and second query objects and a query operator by:

setting a base object type of the third query object to a base object type of the first query object;

setting a clause operator to an AND clause operator if the query operator is an intersection query operator, and setting the clause operator to an AND-NOT clause operator if the query operator is an intersection-complement query operator;

adding one or more clause objects of the first query object to the third query object;

adding the clause operator to the third query object; and adding one or more clause objects of the second query object to the third query object as a subquery if the second query object is of the same base object type as the first query object, and adding the clause object of the second query object to the third query object as additional clauses if the second query object is of a different base object type than the first query object;

generating a query string as a function of the third query object; and submitting the query string to the electronic database, the electronic database presenting the selected information in response to the query string.

2. The method of claim 1, further comprising constructing the third query object as an intersection of the first and second query objects, the third query object containing one or more clause objects of the first query object and a subquery clause object formed by one or more clause objects of the second query object and related to the clause objects of the first query object through an AND clause operator.

3. The method of claim 1, further comprising constructing the third query object as an intersection of the first query object and a logical complement of the second query object, the third query object containing one or more clause objects of the first query object and a subquery clause object formed by one or more clause objects of the second query object and related to the clause objects of the first query object through an AND-NOT clause operator.

4. The method of claim 1, further comprising constructing the third query object as a union of the first and second query objects, the third query object containing one or more clause objects of the first query object and a subquery clause object formed by one or more clause objects of the second query object and related to the clause objects of the first query object through an OR clause operator.

5. The method of claim 4, further constructing the third query object by:

setting a base object type of the third query object to a base object type of the first query object;

adding to the third query object a first clause group comprising the clause objects of the first query object; and adding to the third query object a second clause group comprising the clause objects of the second query object, the second clause group preceded by an OR clause operator.

6. The method of claim 1, wherein at least one of the first, second, and third query objects contains a plurality of clause objects logically grouped together by clause group operators.

7. The method of claim 1, further comprising generating the query string by using the third query object as an SQL builder.

8. The method of claim 1, wherein the electronic database comprises a plurality of data tables each having a plurality of fields, and wherein the method further comprises:

defining, for each of the plurality of data tables, a query object comprising a plurality of properties, each property corresponding to a field of the corresponding data table; and interacting with a data table using its corresponding query object.

9. The method of claim 8, wherein each query object further comprises a base object type property that describes a type of the corresponding data table.

10. The method of claim 8, wherein each query object further comprises a clauses property that generates as output a collection of clauses associated with the query object.

11. The method of claim 1, further comprising generating the query string by:
- obtaining a clause object from a clause collection of the third query object;
- appending a substring to the query string, wherein the substring is a begin group operator if the clause object is a begin group token clause, wherein the substring is an end group operator if the clause object is an end group token clause, wherein the substring is a clause operator if the clause object is a clause operator token clause, and wherein the substring is a clause if the clause object is neither a begin group token clause, an end group token clause, nor a clause operator token clause;
- traversing the third query object to find a next clause object; and
- iteratively obtaining a clause object, appending a substring to the query string, and traversing the third query object until an end of the clause collection is reached.

12. A computer arrangement, comprising a query object having:
- a plurality of clause objects generated as a function of a first set of clause objects contained in a first operand query object, a second set of clause objects contained in a second operand query object, and a query operator, and
- a clause processor module configured to
  - generate a query string as a function of the plurality of clause objects,
  - submit the query string to a database server storing a plurality of data tables, and
  - receive data from the plurality of data tables,
- wherein the query object has a same base object type as the first operand query object, and wherein the plurality of clause objects is generated by:
  - setting a clause operator to an AND clause operator if the query operator is an intersection query operator, and setting the clause operator to an AND-NOT clause operator if the query operator is an intersection-complement query operator;
  - adding one or more clause objects of the first query object to the third query object;
  - adding the clause operator to the third query object; and
  - adding one or more clause objects of the second query object to the third query object as a subquery if the second query object is of the same base object type as the first query object, and adding the clause object of the second query object to the third query object as additional clauses if the second query object is of a different base object type than the first query object.

13. The computer arrangement of claim 12, wherein the query object has the first set of clause objects and a subquery clause object formed by the clause objects in the second set of clause objects and related to the first set of clause objects through an AND clause operator.

14. The computer arrangement of claim 12, wherein the query object has the first set of clause objects and a subquery clause object formed by the clause objects in the second set of clause objects and related to the first set of clause objects through an AND-NOT clause operator.

15. The computer arrangement of claim 12, wherein the query object has the first set of clause objects and a subquery clause object formed by the clause objects in the second set of clause objects and related to the first set of clause objects through an OR clause operator.

16. The computer arrangement of claim 12, wherein at least one of the query object and the first and second operand query objects contains a plurality of clause objects logically grouped together by clause group operators.

17. The computer arrangement of claim 12, wherein the clause processor module is configured to generate the query string by using the query object as an SQL builder.

18. The computer arrangement of claim 12, wherein each of the plurality of data tables has a plurality of fields, and further comprising a plurality of query objects, each corresponding to one of the plurality of data tables and comprising a plurality of properties, each property corresponding to a field of the corresponding data table, wherein a client computer is configured to interact with a data table using its corresponding query object.

19. The computer arrangement of claim 18, wherein each query object further comprises a base object type property that describes a type of the corresponding data table.

20. The computer arrangement of claim 18, wherein each query object further comprises a clauses property that generates as output a collection of clauses associated with the query object.

21. The computer arrangement of claim 12, wherein the clause processor module is further configured to generate the query string by:
- obtaining a clause object from a plurality of clauses of the query object;
- appending a substring to the query string, wherein the substring is a begin group operator if the clause object is a begin group token clause, wherein the substring is an end group operator if the clause object is an end group token clause, wherein the substring is a clause operator if the clause object is a clause operator token clause, and wherein the substring is a clause if the clause object is neither a begin group token clause, an end group token clause, nor a clause operator token clause;
- traversing the query object to find a next clause object; and
- iteratively obtaining a clause object, appending a substring to the query string, and traversing the query object until an end of the plurality of clauses is reached.

22. A computer-readable medium having computer executable modules stored thereon, comprising:
- a query object construction module, configured to
  - receive a first set of clause objects from a first query object, a second set of clause objects from a second query object, and a query operator, and
  - construct a third query object as a function of the first and second sets of clause objects and the query operator by
    - setting a base object type of the third query object to a base object type of the first query object;
    - setting a clause operator to an AND clause operator if the query operator is an intersection query operator, and setting the clause operator to an AND-NOT clause operator if the query operator is an intersection-complement query operator;
    - adding one or more clause objects of the first query object to the third query object;
    - adding the clause operator to the third query object; and
    - adding one or more clause objects of the second query object to the third query object as a subquery if the second query object is of the same base object type as the first query object, and adding the clause object of the second query object to the third query object as additional clauses if the second query object is of a different base object type than the first query object; and a query string generator module, configured to generate a query string as a function of the third query object and to submit the query string to an electronic database, the electronic database presenting information selected in response to the query string.

23. The computer-readable medium 22, wherein the query object construction module is configured to construct the third query object as an intersection of the first and second query objects, the third query object containing the clause objects of the first query object and a subquery clause object formed by the clause objects of the second query object and related to the clause objects of the first query object through an AND clause operator.

24. The computer-readable medium of claim 22, wherein the query object construction module is configured to construct the third query object as an intersection of the first query object and a logical complement of the second query object, the third query object containing the clause objects of the first query object and a subquery clause object formed by the clause objects of the second query object and related to the clause objects of the first query object through an AND-NOT clause operator.

25. The computer-readable medium of claim 22, wherein the query object construction module is configured to construct the third query object as a union of the first and second query objects, the third query object containing the clause objects of the first query object and a subquery clause object formed by the clause objects of the second query object and related to the clause objects of the first query object through an OR clause operator.

26. The computer-readable medium of claim 25, wherein the query object construction module is configured to construct the third query object by:

setting a base object type of the third query object to a base object type of the first query object;

adding to the third query object the first set of clause objects; and adding to the third query object the second set of clause objects preceded by an OR clause operator.

27. The computer-readable medium of claim 22, wherein at least one of the first, second, and third query objects contains a plurality of clause objects logically grouped together by clause group operators.

28. The computer-readable medium of claim 22, wherein the query string generator module is configured to generate the query string by using the third query object as an SQL builder.

29. The computer-readable medium of claim 22, wherein the electronic database comprises a plurality of data tables each having a plurality of fields, and wherein, for each of the plurality of data tables, a query object is defined comprising a plurality of properties, each property corresponding to.a field of the corresponding data table, and wherein all interactions with a data table are conducted using its corresponding query object.

30. The computer-readable medium of claim 29, wherein each query object further comprises a base object type property that describes a type of the corresponding data table.

31. The computer-readable medium of claim 29, wherein each query object further comprises a clauses property that generates as output a collection of clauses associated with the query object.

32. The computer-readable medium of claim 22, wherein the query string generator module is further configured to generate the query string by:

obtaining a clause object from a clause collection of the third query object;

appending a substring to the query string, wherein the substring is a begin group operator if the clause object is a begin group token clause, wherein the substring is an end group operator if the clause object is an end group token clause, wherein the substring is a clause operator if the clause object is a clause operator token clause, and wherein the substring is a clause if the clause object is neither a begin group token clause, an end group token clause, nor a clause operator token clause;

traversing the third query object to find a next clause object; and iteratively obtaining a clause object, appending a substring to the query string, and traversing the third query object until an end of the clause collection is reached.

33. A computer-readable medium having stored thereon a data structure comprising:

a clause collection having a plurality of clause objects generated as a function of a first set of clause objects contained in a first operand query object, a second set of clause objects contained in a second operand query object, and a query operator, and, a clause processor module configured to generate a query string as a function of the plurality of clause objects and to submit the query string to a database server configured to return information selected as a function of the query string, wherein the clause collection is formed by:

setting a base object type of the data structure to a base object type of the first operand query object;

setting a clause operator to an AND clause operator if the query operator is an intersection query operator, and setting the clause operator to an AND-NOT clause operator if the query operator is an intersection-complement query operator;

adding one or more clause objects of the first query object to the third query object;

adding the clause operator to the third query object; and adding one or more clause objects of the second query object to the third query object as a subquery if the second query object is of the same base object type as the first query object, and adding the clause object of the second query object to the third query object as additional clauses if the second query object is of a different base object type than the first query object.

34. The computer-readable medium of claim 33, wherein the clause collection contains the first set of clause objects and a subquery clause object formed by the clause objects of the second set of clause objects and related to the first set of clause objects through an AND clause operator.

35. The computer-readable medium of claim 33, wherein the clause collection contains the first set of clause objects and a subquery clause object formed by the clause objects of the second set of clause objects and related to the first set of clause objects through an AND-NOT clause operator.

36. The computer-readable medium of claim 33, wherein the clause collection contains the first set of clause objects and a subquery clause object formed by the clause objects of the second set of clause objects and related to the first set of clause objects through an OR clause operator.

37. The computer-readable medium of claim 33, wherein at least one of the first and second operand query objects contains a plurality of clause objects logically grouped together by clause group operators.

38. The computer-readable medium of claim 33, wherein the clause processor module is configured to generate the query string by using the clause collection as an SQL builder.

39. The computer-readable medium of claim 33, wherein the clause processor module is further configured to generate the query string by:

obtaining a clause object from the clause collection;

appending a substring to the query string, wherein the substring is a begin group operator if the clause object is a begin group token clause, wherein the substring is an end group operator if the clause object is an end group token clause, wherein the substring is a clause operator if the clause object is a clause operator token clause, and wherein the substring is a clause if the clause object is neither a begin group token clause, an end group token clause, nor a clause operator token clause;

traversing the clause collection to find a next clause object; and iteratively obtaining a clause object, appending a substring to the query string, and traversing the clause collection until an end of the clause collection is reached.

\* \* \* \* \*